United States Patent
Borchers et al.

(10) Patent No.: US 9,221,450 B2
(45) Date of Patent: Dec. 29, 2015

(54) METHOD FOR OPERATING A VEHICLE WITH AN ELECTRIC DRIVE MACHINE

(75) Inventors: Frank Borchers, Meinersen (DE); Frank Stebner, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 63 days.

(21) Appl. No.: 14/123,990

(22) PCT Filed: Jun. 4, 2012

(86) PCT No.: PCT/EP2012/002355
§ 371 (c)(1),
(2), (4) Date: Mar. 5, 2014

(87) PCT Pub. No.: WO2012/167897
PCT Pub. Date: Dec. 13, 2012

(65) Prior Publication Data
US 2014/0229045 A1    Aug. 14, 2014

(30) Foreign Application Priority Data
Jun. 9, 2011   (DE) .......................... 10 2011 103 660

(51) Int. Cl.
| B60T 13/74 | (2006.01) |
| B60W 20/00 | (2006.01) |
| B60T 17/00 | (2006.01) |
| B60T 1/10 | (2006.01) |
| B60T 7/04 | (2006.01) |
| B60T 8/88 | (2006.01) |

(Continued)

(52) U.S. Cl.
CPC . *B60T 17/00* (2013.01); *B60T 1/10* (2013.01); *B60T 7/042* (2013.01); *B60T 8/885* (2013.01); *F16D 61/00* (2013.01); *F16D 65/0037* (2013.01); *B60T 2220/04* (2013.01); *B60T 2270/406* (2013.01); *B60T 2270/604* (2013.01)

(58) Field of Classification Search
CPC ............ B60K 1/00; F16D 65/00; B60T 13/74
See application file for complete search history.

(56) References Cited

U.S. PATENT DOCUMENTS

| 2009/0065273 A1* | 3/2009 | Wyatt et al. ................... 180/65.8 |
| 2009/0145673 A1* | 6/2009 | Soliman et al. .............. 180/65.1 |

(Continued)

FOREIGN PATENT DOCUMENTS

| CN | 101484341 A | 7/2009 |
| DE | 10336047 A1 | 2/2004 |

(Continued)

OTHER PUBLICATIONS

Search Report and Written Opinion for International Patent Application No. PCT/EP2012/002355; Sep. 20, 2012.

(Continued)

*Primary Examiner* — Helal A Algahaim
*Assistant Examiner* — Michael Fouche
(74) *Attorney, Agent, or Firm* — Barnes & Thornburg LLP

(57) ABSTRACT

A method for operating a vehicle having an electric machine for driving the vehicle and a brake system. Electric energy can be recovered from a movement of the vehicle by the electric machine. In the method, a state of the brake system of the vehicle is determined, and an actuation of a brake pedal of the vehicle is detected. A brake pressure of the brake system and an energy recovery by the electric machine are adjusted dependent on the state of the brake system and the actuation of the brake pedal.

7 Claims, 2 Drawing Sheets

(51) Int. Cl.
 *F16D 61/00* (2006.01)
 *F16D 65/00* (2006.01)

(56) References Cited

U.S. PATENT DOCUMENTS

2009/0288921 A1* 11/2009 Meckel .................. 188/73.1
2009/0302673 A1* 12/2009 Linhoff ...................... 303/3

FOREIGN PATENT DOCUMENTS

| DE | 10355258 | A1 | 6/2005 |
| DE | 10356504 | A1 | 7/2005 |
| DE | 102006034936 | A1 | 1/2008 |
| DE | 102006055765 | A1 | 1/2008 |
| DE | 102009016732 | A1 | 10/2010 |
| EP | 1547891 | A1 | 6/2005 |
| JP | 2006103630 | A | 4/2006 |

OTHER PUBLICATIONS

Chinese Office Action for Chinese Patent Application No. 2012800273915, dated Jun. 4, 2015.

* cited by examiner

METHOD FOR OPERATING A VEHICLE WITH AN ELECTRIC DRIVE MACHINE

PRIORITY CLAIM

This patent application is a U.S. National Phase of International Patent Application No. PCT/EP2012/002355, filed Jun. 4, 2012, which claims priority to German Patent Application No. 10 2011 103 660.5, filed Jun. 9, 2011, the disclosures of which are incorporated herein by reference in their entirety.

SUMMARY

The present disclosure relates to a method for operating a vehicle which comprises an electrical machine for driving the vehicle. The present disclosure relates, in particular, to a method for a vehicle, in which method electrical energy can be recovered from a movement of the vehicle by means of the electrical machine. Finally, the present disclosure relates to a vehicle in which the method is used.

BRIEF DESCRIPTION OF THE DRAWINGS

The present disclosure will be explained in detail below with reference to the drawings.

DETAILED DESCRIPTION OF THE DISCLOSED EMBODIMENTS

Figure 1:
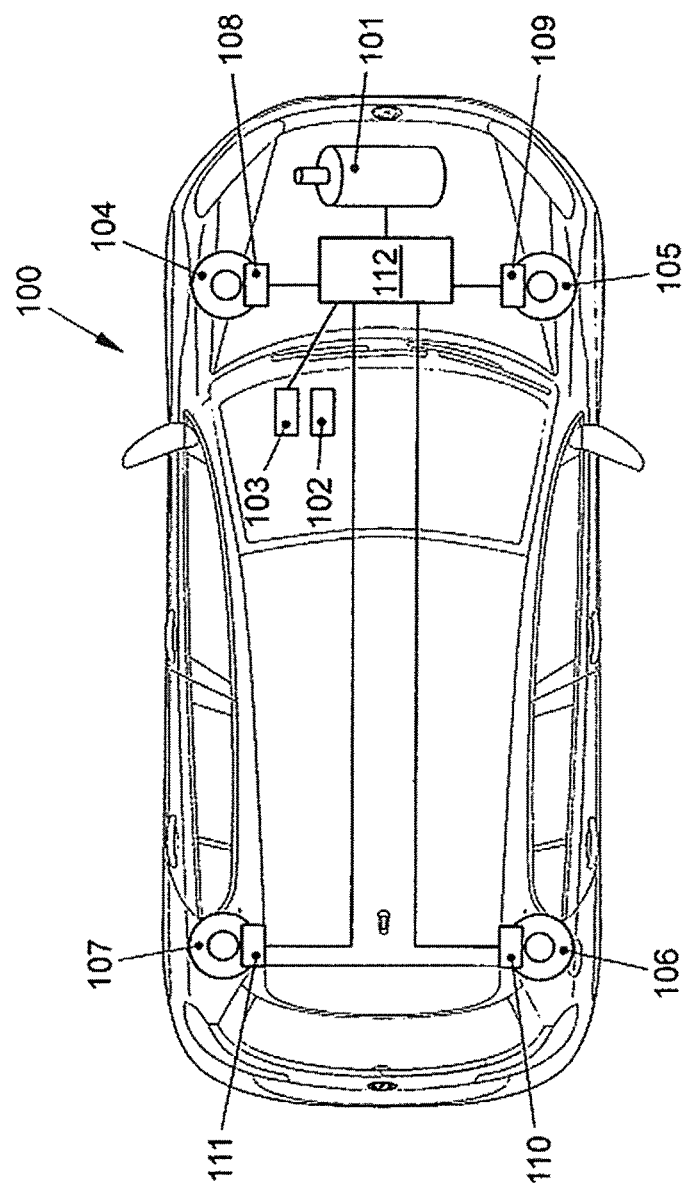
FIG. 1 schematically shows a plan view of a vehicle according to at least one disclosed embodiment.

Vehicles having an electrical drive machine, for example electric vehicles or hybrid vehicles, usually have two brake mechanisms. Firstly, these vehicles have a brake system of the conventional kind, for example a hydraulic brake system which converts kinetic energy produced by the vehicle into heat by means of frictional bodies, for example brake linings, brake disks and brake drums. Secondly, the electrical machine can be moved to generator operation or recuperation operation by means of suitable actuation, to convert kinetic energy produced by the vehicle into electrical energy which can be fed to an electrical energy store of the vehicle to subsequently be reused with the aid of the electrical machine to drive the vehicle. For the purposes of optimizing energy consumption by the vehicle, the vehicle may be braked by the recuperation operation. As a result, the brake system is used correspondingly less frequently, as a result of which soiling and corrosion at the ripe bodies of the brake system can occur to an increased extent, and this can therefore adversely affect the braking function and service life of the brake system.

Illustrative embodiments ensure the required service life and braking effect of the brake system of a vehicle having an electrical drive machine.

Illustrative embodiments provide a method for operating a vehicle, an apparatus for a vehicle, and a vehicle.

A method for operating a vehicle which comprises an electrical machine for driving the vehicle and comprises a brake system is provided. The vehicle is able to recover electrical energy from a movement of the vehicle by means of the electrical machine. In the method, a state of the brake system of the vehicle is determined and an actuation operation of a brake pedal of the vehicle is detected. A brake pressure of the brake system and an energy recovery operation by means of the electrical machine are adjusted depending on the state of the brake system and the actuation of the brake pedal. As described above, the state of the brake system can be adversely affected, for example, due to infrequent or weak actuation operations. Since the brake pressure of the brake system and the energy recovery by means of the electrical machine are adjusted depending on the state of the brake system, it is possible, for example in a good state of the brake system, for the vehicle to be decelerated mainly by means of the electrical machine and the energy recovery, whereas it is possible for the vehicle to be decelerated by means of the brake system given a poor state of the brake system, to clean, for example, brake bodies of the brake system as a result and therefore to improve the state of the brake system. As a result, the service life of the brake system can be increased and, furthermore, good effectiveness of the brake system can be ensured.

Determining the state of the brake system can comprise, for example, determining a degradation state of the brake system. The degradation state indicates degradation of a braking effect of the brake system due to corrosion or soiling of the frictional bodies of the brake system. As the degradation of the braking effect of the brake system increases, a ratio of brake pressure to energy recovery can be increased. As a result, it is possible to ensure that the brake system is actuated as infrequently as possible, but often enough to ensure reliable operation of the brake system. At the same time, as much electrical energy as possible can be recovered.

According to at least one disclosed embodiment, determining the state of the brake system comprises detecting activation operations of the brake system in a predetermined time interval before the actuation of the brake pedal is detected. For example, a frequency of activation operations of the brake system in the predetermined time interval or a time difference between a last activation operation of the brake system and the current actuation of the brake pedal can be detected to derive from this whether actuation of the brake system for cleaning the frictional bodies of the brake system is required or not. As a result, the actuation of the brake system can be reduced to a minimum to be able to recover as large an amount of electrical energy as possible during operation of the vehicle.

According to a further disclosed embodiment, an intensity of an activation of the brake system is detected to determine the state of the brake system. Since the cleaning effect of the frictional bodies increases as the intensity of an actuation operation increases, that is to say as the brake pressure increases, detecting the braking intensity, for example over a predetermined past period of time, can provide information about the state of the brake system.

According to a further disclosed embodiment, the state of the brake system is determined by a braking effect of the brake system being determined. Since the braking effect of the brake system decreases as soiling or corrosion of the frictional bodies increases, the state of the brake system can be reliably determined by determining the braking effect of the brake system. To this end, a brake pressure of the brake system for example can be determined when the brake system is activated and a speed profile of the vehicle can be determined when the brake system is activated. The speed profile of the vehicle can be used to ascertain the deceleration of the vehicle at the detected brake pressure. If the state of the brake system is adversely affected by corrosion or soiling of the frictional bodies of the brake system, a higher brake pressure is required to achieve a predetermined deceleration of the vehicle. Therefore, conclusions can be drawn about the state of the brake system from the brake pressure and the speed profile of the vehicle.

Furthermore, the energy recovery by means of the electrical machine in a predetermined time interval before the actuation of the brake pedal is detected can be detected to determine the state of the brake system. When energy has been recovered very frequently by means of the electrical machine in the predetermined time interval, the brake system has been actuated less often and less intensively, as a result of which the state of the brake system can have been adversely affected. Accordingly, conclusions can also be drawn about the state of the brake system by detecting the energy recovery processes in the predetermined time interval.

Illustrative embodiments provide an apparatus for a vehicle which comprises an electrical machine for driving the vehicle and comprises a brake system. The vehicle is able to recover electrical energy from a movement of the vehicle by means of the electrical machine, that is to say to convert kinetic energy produced by the vehicle into electrical energy by means of the electrical machine. The apparatus is able to determine a state of the brake system of the vehicle, to detect an actuation operation of the brake pedal of the vehicle, and to adjust a brake pressure of the brake system and an energy recovery operation by means of the electrical machine depending on the state of the brake system and the actuation of the brake pedal. The apparatus can be designed to carry out the above-described method and therefore also comprises the above-described advantages.

Illustrative embodiments provide a vehicle which comprises an electrical machine for driving the vehicle. The vehicle is designed to recover electrical energy from a movement of the vehicle by means of the electrical machine. The vehicle further comprises a brake system, a brake pedal and the above-described apparatus. Therefore, the vehicle likewise comprises the above-described advantages.

FIG. 1 shows a vehicle 100 comprising an electrical drive machine 101. The electrical drive machine 101 is coupled to drive wheels (not shown) of the vehicle 100 and is able to drive the wheels to set the vehicle in motion. Furthermore, the electrical drive machine 101 is able to convert kinetic energy produced by the vehicle 100 into electrical energy by means of suitable driving by a torque which opposes a rotation of the drive wheels being exerted on the drive wheels by the electrical drive machine 101. The vehicle 100 further comprises an electrical energy store which is not shown in FIG. 1, to provide electrical energy for driving the electrical drive machine 101 and to store electrical energy which is generated by the electrical drive machine 101. The process of generating electrical energy from kinetic energy produced by the vehicle 100 is also called energy recovery or recuperation.

The vehicle 100 further comprises an accelerator pedal 102 and a brake pedal 103. A driver of the vehicle 100 sets a desired energy output of the electrical drive machine 101 on the drive wheels of the vehicle 100 by means of the accelerator pedal 102 and the driver of the vehicle 100 sets a desired deceleration of the vehicle 100 by means of the brake pedal 103 or limits an acceleration of the vehicle 100 when it is rolling downhill for example. In the text which follows, the term "deceleration of the vehicle" is used in a generalized form which comprises both actual deceleration of the vehicle 100 and also limiting acceleration of the vehicle 100. In other words, the term "deceleration of the vehicle" is used in the text which follows for a state of the vehicle in which a moment is exerted on the drive wheels of the vehicle, this moment opposing a current direction of rotation of the drive wheels.

The vehicle 100 further comprises a brake system, only four brake disks 104-107 and respectively associated brake calipers 108-111 of the brake system being illustrated in FIG. 1. The brake system can also comprise other frictional bodies instead of the shown brake disks 104-107 and brake calipers 108-111, for example drum brakes with corresponding drum brake cylinders. The brake system can comprise, for example, a hydraulic brake system or an electrical brake system. Therefore, the vehicle 100 has two possible ways in which the vehicle 100 can be decelerated, specifically by recuperation by means of the electrical drive machine 101 and by means of the brake system. Therefore, the vehicle 100 comprises an apparatus 112 which is coupled to the brake pedal, to the brake system and to the electrical drive machine 101. The apparatus 112 can comprise, for example, a control apparatus with a microprocessor control system.

The apparatus 112 is able to detect an actuation operation of the brake pedal 103 and to adjust a brake pressure of the brake system depending on the actuation of the brake pedal 103 and to adjust an energy recovery operation by means of the electrical machine 101. In this case, all of the deceleration which is requested by way of the brake pedal 103 or as large a portion of the deceleration as possible is usually generated by means of the electrical drive machine 101 by way of energy recovery as far as possible. However, this can result in the brake disks 104-107 becoming corroded or soiled during the course of the relatively low number of actuation operations of the hydraulic brake system and soiling the brake linings of the brake calipers 108-111. As a result, the effect of the hydraulic brake system can decrease and the service life of the brake system can be shortened if reliable operation of the brake system can no longer be ensured due to corrosion and soiling. Therefore, the apparatus 112 continuously determines the state of the brake system over the course of operation of the vehicle 100 and, if the apparatus 112 establishes that the hydraulic brake system has not been actuated often enough or intensively enough, the vehicle 100 brakes more intensively by way of the hydraulic brake system the next time the brake pedal 103 is actuated, to thereby provide self-cleaning of the brake bodies, that is to say the brake disks 104-107 and the brake linings of the brake calipers 108-111. For example, the apparatus 112 takes into account the proportion of braking activities which are carried out hydraulically and the proportion of braking activities which are carried out recuperatively. On the basis of, for example, two integrators, a decision is periodically made in respect of whether braking should be carried out to clean the brake bodies with the aid of the hydraulic brake system. This process can be executed such that it cannot be detected by a driver of the vehicle and in an energy-optimized manner.

Figure 2:
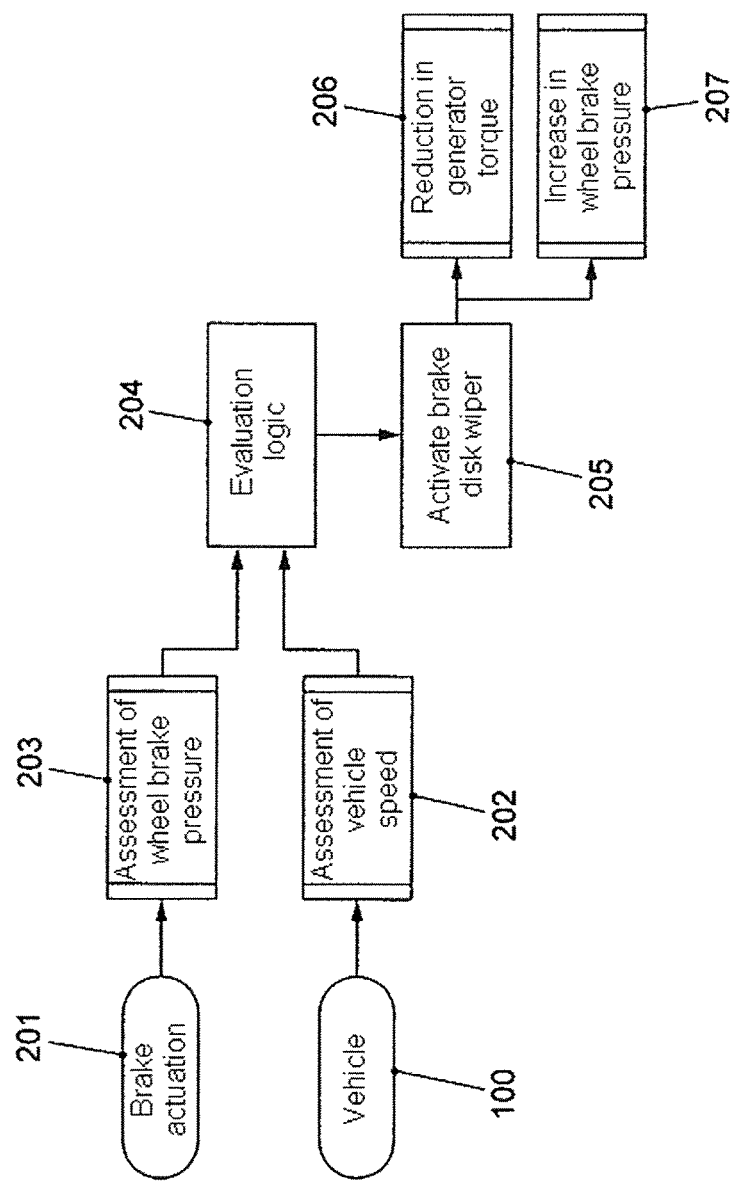
FIG. 2 schematically shows a sequence of a method according to at least one disclosed embodiment.

A further disclosed embodiment of the manner of operation of the apparatus 112 will be described below in conjunction with FIG. 2. On account of the brake actuation 201 of the brake pedal 103, the apparatus 112 adjusts a brake pressure of the brake system and an energy recovery operation by means of the electrical machine 101. This results in a deceleration of the vehicle, which deceleration is determined from data relating to the vehicle 100 by means of assessing the vehicle speed 202. The wheel brake pressure which is hydraulically built-up is similarly assessed (step 203) and the wheel brake pressure and the profile of the vehicle speed are supplied to an evaluation logic 204. Therefore, a current degree of efficiency of the brake system of the vehicle 100 can be determined and, depending on this degree of efficiency, a decision can be made as to whether self-cleaning of the brake system by more intensive actuation should be carried out. If this is the case, brake disk wiping is activated in step 205, as a result of which the braking moment by the electrical drive machine is reduced the next time the brake is actuated or during current actuation of the brake, that is to say the generator torque is reduced (step 206) and the wheel brake pressure is increased (step 207).

In addition, the apparatus 112 can determine, for example during operation of the vehicle 100, how often the vehicle 100 has been decelerated by means of the generator-operated drive machine 101 and how often and intensively the hydraulic brake system has been actuated. Depending on this detected information, the energy recovery by means of the electrical drive machine 101 during a braking process can be increased to the effect of increasing the brake pressure of the brake system, when certain threshold values are exceeded or undershot for example, to prevent the functioning of the hydraulic brake system being adversely affected. For example, brake disk wiping can be activated when the hydraulic brake system has not been actuated for longer than a predetermined period of time or has been actuated only below a predetermined braking intensity within a predetermined period of time. Similarly, frequency of actuation of the hydraulic brake system can be used as a criterion for activating brake disk wiping.

In vehicles, such as passenger cars or heavy goods vehicles for example, reliable operation of a brake system of the vehicle is of high importance under all conditions and over the entire service life of the vehicle. To ensure reliable and effective operation of the brake system of the vehicle even in wet conditions for example, the prior art discloses various methods for keeping frictional bodies of the brake system, for example a brake disk, a brake lining or a brake drum, as dry as possible during operation of the vehicle, even in wet or damp conditions.

DE 103 55 258 A1 discloses optimized wiping of vehicle brakes. When brakes of the motor vehicle are wiped in wet conditions, the brake linings are applied to the braked element with slight pressure. This wiping of the brakes is not noticeable or only very slightly noticeable when the wiping process is initiated at a time at which the change in the accelerator pedal position or the change in the vehicle speed exceeds a predefined threshold value.

DE 103 36 047 A1 discloses a method for improving the braking behavior of a motor vehicle when it is raining. In this case, the brake disks are wiped by activation of the brakes. According to the method, a hydraulic pump is actuated while simultaneously fulfilling the conditions of rain identification, non-actuation of the brake and actuation of the accelerator pedal, and a build-up of pressure which is sufficient to wipe the brake disks is at least briefly created by opening a pressure medium path which leads from the main cylinder to the wheel brakes and by opening a pressure medium path to the intake end of the hydraulic pump in the brake system.

DE 10 2009 016 732 A1 discloses a method for drying a service brake of a motor vehicle, the service brake comprising a brake disk and brake linings, in which method the brake linings are applied to the brake disk in such a way that there is no appreciable deceleration of the vehicle. To this end, the reduction in pressure on the accelerator pedal is monitored and the method for drying is activated when a threshold value for the reduction in pressure is exceeded.

Finally, DE 103 56 504 B4 relates to a method for wiping brakes of a vehicle in wet conditions. Brake linings are applied to a braked element, in particular a brake disk, under slight pressure. A probability of braking or a variable from which a probability of braking can be estimated is ascertained and a wiping process is carried out on the condition that the probability of braking or the variable exceeds a predefined threshold value.

The invention claimed is:

1. A method for operating a vehicle, wherein the vehicle comprises an electrical machine for driving the vehicle and comprises a brake system, wherein the vehicle is designed to recover electrical energy from a movement of the vehicle by the electrical machine, the method comprising:

determining a state of the brake system of the vehicle;
detecting an actuation operation of a brake pedal of the vehicle; and
adjusting a brake pressure of the brake system and an energy recovery operation by means of the electrical machine depending on the state of the brake system and the actuation of the brake pedal,
wherein determining the state of the brake system comprises determining a degradation state of the brake system, wherein the degradation state indicates degradation of a braking effect of the brake system due to corrosion or soiling of frictional bodies of the brake system,
wherein adjusting the brake pressure of the brake system and the energy recovery by the electrical machine comprises:
increasing a ratio of brake pressure to energy recovery as degradation of the braking effect of the brake system increases.

2. The method of claim 1, wherein determining the state of the brake system comprises detecting activation operations of the brake system in a predetermined time interval before the actuation of the brake pedal is detected.

3. The method of claim 1, wherein determining the state of the brake system comprises detecting an intensity of an activation operation of the brake system.

4. The method of claim 1, wherein determining the state of the brake system comprises determining a braking effect of the brake system.

5. The method of claim 4, wherein determining the braking effect comprises:
determining a brake pressure of the brake system when the brake system is activated; and
determining a speed profile of the vehicle when the brake system is activated.

6. An apparatus for a vehicle, wherein the vehicle comprises
an electrical machine for driving the vehicle and comprises a brake system, wherein the vehicle is designed to recover electrical energy from a movement of the vehicle by means of the electrical machine,
wherein the apparatus is designed:
to determine a state of the brake system of the vehicle by determining energy recovery operations by means of the electrical machine in a predetermined time interval before actuation of a brake pedal is detected;
to detect an actuation operation of the brake pedal of the vehicle; and
to adjust a brake pressure of the brake system and an energy recovery operation by means of the electrical machine depending on the state of the brake system and the actuation of the brake pedal.
wherein adjusting the brake pressure of the brake system and the energy recovery by the electrical machine comprises:
increasing a ratio of brake pressure to energy recovery as degradation of the braking effect of the brake system increases.

7. A vehicle, comprising:
an electrical machine for driving the vehicle, wherein the vehicle is designed to recover electrical energy from a movement of the vehicle by the electrical machine;
a brake system;
a brake pedal; and
an apparatus as claimed in claim 6.

* * * * *